2,525,679

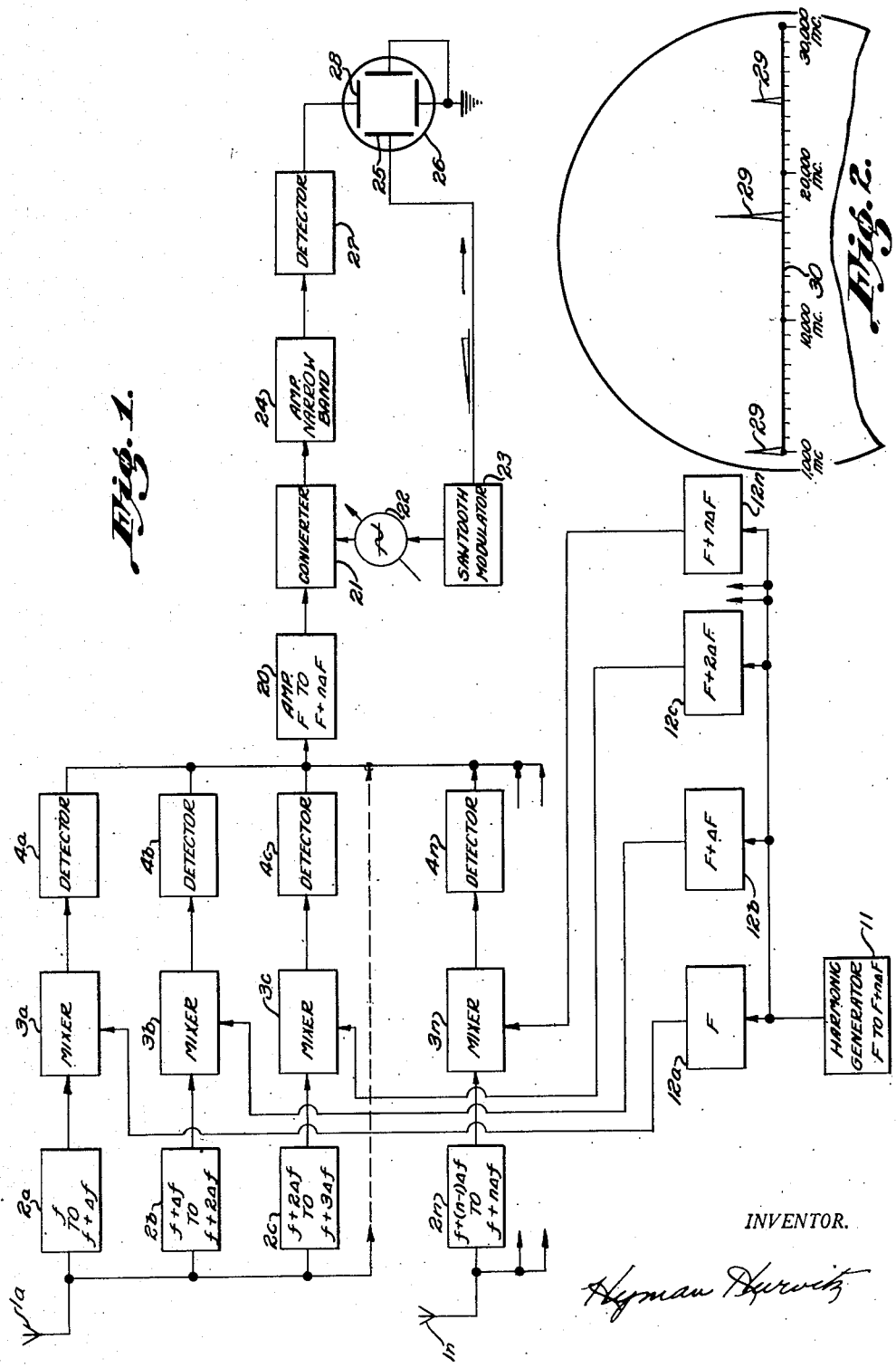
Oct. 10, 1950     H. HURVITZ     2,525,679
MULTIBAND PANORAMIC RECEIVING SYSTEM
Filed Feb. 6, 1948
INVENTOR.
Hyman Hurvitz Patented Oct. 10, 1950

UNITED STATES PATENT OFFICE 2,525,679

MULTIBAND PANORAMIC RECEIVING SYSTEM

Hyman Hurvitz, Washington, D. C., assignor of one-half to Marcel Wallace, doing business as Panoramic Laboratories, East Portchester, Conn., and one-half to Panoramic Radio Corporation, New York, N. Y., a corporation Application February 6, 1948, Serial No. 6,623

11 Claims. (Cl. 250—20)

This invention relates generally to radio receiving systems, and more particularly to frequency scanning receiving systems adapted for monitoring extremely wide portions of the radio spectrum.

Frequency scanning or panoramic receiving systems are well known in the art of radio reception. While various forms of such systems are feasible, it is the usual practice to utilize the superheterodyne principle, sweeping the frequency of the local oscillator to effect reception of a frequency spectrum in successive increments. The cathode ray beam of a cathode ray oscilloscope is deflected horizontally in synchronism with the frequency sweep of the local oscillator to provide a frequency base, and the output of the superheterodyne receiver is applied to the vertical plates of the oscilloscope to provide a presentation of signal amplitudes at various frequencies. This system is not suitable for extremely wide band reception, say over a spectrum of from 500–10,000 mc. since no single known superheterodyne receiver is capable of tuning over so wide a band and further, since the rate of sweep which is permissible in extremely wide band panoramic receivers is limited, a too rapid sweep resulting in loss of response to received signals.

The problem exists, nevertheless, of monitoring an extremely wide band of frequencies continuously, particularly for military purposes. This problem has been solved in the past, by utilizing a plurality of panoramic receivers, each covering a portion of the spectrum desired to be monitored. This solution, which may be denominated the brute force solution, is expensive, and requires a great deal of equipment, for which space may not be available, especially in military aircraft.

It is the primary purpose of the present invention to provide a system of radio reception adapted to provide in a single receiver indicator, means for monitoring an extremely wide frequency spectrum.

Briefly described, the present invention utilizes the principle of tagging or identifying signals occurring in successive portions of a frequency spectrum with identification frequencies, occupying each a slightly different position in an identification spectrum, and applying the identification spectrum to a panoramic receiver for display thereby. The identification spectrum may be located at any desired range of frequency values, and the separation of the identifying frequencies may be made as small as desired, so that by proper selection the system may operate in conjunction with a conventional or commercial model of panoramic receiver or adaptor.

In principle, a spectrum to be monitored may be divided into convenient segments. So the spectrum from 1,000 to 10,000 mc. may be divided into segments of 500 mc., providing 20 such segments, for the sake of example. A series of radio frequency filters may be provided to separate signals received in the spectrum 1000 to 20,000 mc. into separate channels corresponding to the segments. Each channel may comprise a modulator, say a crystal mixer, and to each modulator may be applied a different identification signal, say in the band 10 to 12 megacycles, and occurring at intervals of .1 megacycle. Each channel further contains a detector for detecting the identification modulations, and these may be analyzed and displayed by a panoramic receiver capable of handling the band 10–12 mc.

Should a signal be received say between 1,000 and 1,500 mc. that signal will be modulated with an identifying signal of 10 mc. The modulated signal will then be detected to abstract the 10 mc. modulation and the latter will be displayed on the panoramic receiver. In the absence of a signal in the band 1,000 to 1,500 mc. no such display will occur since there will be no mechanism for conveying the modulating signal to the detector.

There is no way provided in the system for distinguishing the precise frequency value of a signal in any frequency spectrum segment nor whether more than a single such signal exists. This disadvantage is counterbalanced by the frequency compression features of the invention, which permit continuous monitoring of a spectrum as wide as desired with a single receiver and display system.

The system may be extended to operation at any desired frequency values, the spectrum segments being increased in extent at the higher frequencies. So the band 10,000 to 30,000 mc. may be covered in steps of 1,000 mc., by supplying additional identification signals, and without requiring an additional display or panoramic receiving equipment.

In effect, by virtue of the present system, a band from 1,000 to 30,000 mc., and in fact, any desired spectrum, may be scanned at the rate of 60 times per second, electronically, without any difficulty. The fact that different filtering, modulating and detecting techniques are required at different ranges of frequencies is of no moment, and any number of discrete receiving antennas may be utilized, as required to cover the desired band.

The system is extremely flexible, enabling extension to additional frequencies without redesign of an existing equipment or installation.

The invention as exemplified in a specific embodiment is described hereinafter, the description being taken in conjunction with the appended drawings, wherein:

Figure 1 is a block diagram of the present invention; and

Figure 2 is a representation of the face of a panoramic indicator in the present system.

Proceeding now with a description of a specific embodiment of the invention, the reference numerals 1a to 1n identify receiving antennas, adapted for receiving signals in discrete and different portions of a frequency spectrum $f$ to $f+n$ $\Delta f$, where for the sake of example $f$ may equal 1,000 mc., $f+n\Delta f=30,000$ mc., $n=30$ and $\Delta f=1,000$ mc. Obviously, $\Delta f$ need not be uniform over the system, and the total spectrum may be extended upward or downward as desired, from the values given, as many antennas being utilized as are required to cover the desired spectrum.

The reference numerals 2a to 2n inclusive identify band pass filters, for passing the bands $f$ to $f+n$ $\Delta f$, in increments of $\Delta f$. As many filters as are required for any particular application may be employed, a total of four being shown in the drawings for the sake of simplification only. It is realized that some overlap of adjacent filters is inevitable in practical designs, which causes some loss of resolution, without affecting the principle of operation of the system.

The output of each of the band pass filters 2a–2n, inclusive, is applied to a separate mixer, appropriate to the frequency involved, as a carrier, the mixers being identified by the reference numerals 3a–3n inclusive. Different modulating signals are applied to the separate mixers 3a–3n inclusive, these being derived from a harmonic generator 11, of known character, which provides a series of signals, each series of substantially equal amplitude and with equal frequency separations $\Delta F$. For the sake of example, the lowest frequency selected at the output of the oscillator 11, by means of a band pass filter 12a, may be a frequency F having a value of 10 mc. The value of $\Delta F$ may equal .1 mc. A further series of filters 12b to 12n inclusive may be coupled in parallel with the output of the oscillator 11, for selecting discrete components of this output. In our example, since $n=30$, thirty such filters are required, for separating into separate channels 30 identificatory signals F to F+$n$ $\Delta F$, each separated from its neighbors by the value $\Delta F=.1$ mc. Identification frequencies of successively increasing value may be applied to modulate carriers in spectrum segments of successively increasing value, via the mixers 3a–3n inclusive.

The outputs of the mixers 3a–3n inclusive are applied to detectors 4a–4n inclusive, respectively, where the identifying signals F to F+$n$ $\Delta F$ are separated from the carriers $f$ to $f+n$ $\Delta f$, respectively, the outputs being applied in parallel to an amplifier 20 having a pass band at least F to F+$n$ $\Delta f$. In the absence of a carrier component, the associated identification signal will be absent in the amplifier 20. A signal in any one of the bands passed by the filters 2a–2n inclusive effects transfer of a corresponding identification signal to the amplifier 20. The band of frequencies $f$ to $f+n$ $\Delta f$ has accordingly been translated to the band F to F+$n$ $\Delta F$, the former band covering say 30,000 mc. while the latter covers 3 mc. The latter band may obviously be reduced by reducing $\Delta F$, and may be located at any position in the radio spectrum, as convenient.

The output circuit of the mixers 3a–3n, and/or the input circuits of the detectors 4a–4n, and/or the transmission path therebetween will obviously be selective to the carrier frequencies, and may be adapted to reject the modulation frequencies F to F+$n$ $\Delta F$, to avoid the possibility of transmission of the latter frequencies to the amplifier 20 without the intervention of a carrier.

The output of the amplifier 20 may be analyzed in various ways, known to the art, per se. However, I prefer, and find it most convenient, to analyze the band F to F+$n$ $\Delta F$ by means of the well known panoramic technique. The output of the amplifier 20 is applied to a converter 21 to which is applied a heterodyning local frequency derived from an oscillator 22, the frequency of which is swept by a sawtooth modulator 23, the converter 21 operating into a narrow band I. F. amplifier 24, having a narrow pass band, say less than .5 $\Delta F$. The signals present in the amplifier 20 are thus passed through the amplifier 24 in succession.

The sawtooth modulator 23 may further provide a sawtooth D. C. voltage to the horizontal plates 25 of a cathode ray tube indicator 26, the output of the amplifier 24 being detected in a detector 27, the output of which is applied to the vertical plates 28 of the indicator 26.

As the frequency band F to F+$n$ $\Delta F$ is caused to scan past the frequency gate 24 by the converter 21, successive ones of the identifying signals F to F+$n$ $\Delta F$ are applied to cause vertical deflection of the beam of the indicator, the beam at all times occupying positions against a horizontal axis which may be calibrated in terms of the frequencies F to F+$n$ $\Delta F$ and hence in terms of the frequencies $f$ to $f+n$ $\Delta f$.

The indicator 26 thus presents a spectrum analysis of the spectrum $f$ to $f+n$ $\Delta f$, the pips 29 representing intercepted carrier signals which may be identified by reference to a calibration scale 30.

While I have disclosed one specific embodiment of the present invention, it will be clear that modifications of the arrangement and of its details may be resorted to without departing from the true spirit of the invention, as defined in the appended claims.

What I claim and desire to secure by Letters Patent of the United States is:

1. A wave energy receiving system comprising means for intercepting wave energy signals subsisting in a predetermined frequency spectrum, means for channeling wave energy signals subsisting in separate segments of said spectrum into separate channels, means located solely at said receiving system for modulating wave energy signals in each of said channels with a different identifying signal, means for detecting wave energy signals subsisting in each of said channels to abstract therefrom said identifying signals, and means for displaying said identifying signals to indicate the presence of signals in said channels.

2. The combination in accordance with claim 1 wherein said identifying signals are signals of different frequencies.

3. The combination in accordance with claim 2 wherein said means for displaying comprises a cathode ray tube indicator and means for creating on the face thereof a display of said signals of different frequencies against a frequency calibrated base line.

4. A wave energy receiving system comprising means for intercepting wave energy signals subsisting in a predetermined wave energy frequency spectrum extending within the band $f$ to $f+n\,\Delta f$, where $f$ is a first frequency, $n$ is any integer, and $\Delta f$ is an increment of frequency, means for channeling wave energy signals subsisting within the bands of separate increments of frequency $\Delta f$ into separate channels, means located solely at said receiving system for modulating said wave energy signals in each of said channels with a different one of a plurality of identifying signals of different frequency, extending over the band $F$ to $F+n\,\Delta F$, where $F$ is a low frequency relative to $f$, and where $\Delta F$ is an increment of frequency small relative to $\Delta f$, means in each of said channels for detecting said identifying signals as modulations of said wave energy signals, and means for displaying the detected identifying signals substantially simultaneously.

5. The combination in accordance with claim 4 wherein said means for displaying comprises a cathode ray tube indicator, and means responsive to said detected identifying signals for actuating said cathode ray tube to indicate the frequencies of said identifying signals.

6. The combination in accordance with claim 4 wherein said means for displaying comprises a frequency scanning oscillator, a converter, means for applying the outputs of said detectors to said converter, means for applying the output of said scanning oscillator to said converter, means for applying the output of said converter to a narrow band pass translating element having a pass band less than $\Delta F$, a cathode ray tube indicator, means for deflecting the cathode ray beam of said indicator in one direction in synchronism with the scanning of said frequency scanning oscillator, and means for deflecting the cathode ray beam of said indicator in another direction in accordance with the amplitude of signals in said translating element.

7. The combination in accordance with claim 4 wherein said means for displaying comprises a cathode ray tube indicator.

8. The combination in accordance with claim 4, wherein said means for displaying comprises a frequency scanning wave energy spectrum analyzer for the band of frequencies $F$ to $F+n\,\Delta F$.

9. A wave energy receiving system comprising, a plurality of wave energy receiving channels, means tuning separate ones of said receiving channels to receive different portions of a wave energy frequency spectrum, means located solely at said receiving system for modulating wave energy in each of said separate channels with a different and distinctive identifying signal, and means for generating a different and distinctive indication in response to wave energy in said receiving channels in accordance with the character of the identifying signal modulation thereof.

10. A wave energy receiving system, comprising, means for intercepting a predetermined wave energy frequency spectrum, means for dividing said spectrum in a plurality of frequency sub-bands, means located solely at said receiving system for modulating wave energy in separate ones of said frequency sub-bands each with a different identifying signal, means for detecting said wave energy in each of said sub-bands to derive said identifying signals, and means responsive to said identifying signals when detected for indicating the presence of wave energy in said sub-bands.

11. A wave energy receiving system comprising means for intercepting wave energy signals subsisting in a predetermined frequency spectrum, means for channeling wave energy signals subsisting in separate segments of said spectrum into separate channels, means located solely at said receiving system for modulating wave energy in each of said channels with a different identifying signal, means for detecting wave energy subsisting in each of said channels to abstract therefrom said identifying signals, and means responsive to said identifying signals for providing a distinguishable signal in response to each of said identifying signals.

HYMAN HURVITZ.

REFERENCES CITED

The following references are of record in the file of this patent:

UNITED STATES PATENTS

| Number | Name | Date |
|---|---|---|
| 1,851,495 | Clement | Mar. 29, 1932 |
| 2,028,212 | Heising | Jan. 21, 1936 |
| 2,312,203 | Wallace | Feb. 23, 1943 |
| 2,400,133 | Pray | May 14, 1946 |
| 2,414,096 | Dimond | Jan. 14, 1947 |
| 2,465,500 | Wallace et al. | Mar. 29, 1949 |

FOREIGN PATENTS

| Number | Country | Date |
|---|---|---|
| 477,890 | Great Britain | Jan. 3, 1938 |

OTHER REFERENCES

Terman, "Radio Engineering," McGraw-Hill (1947), pp. 843, 844, 847.